(12) United States Patent
Thompson et al.

(10) Patent No.: US 10,472,025 B2
(45) Date of Patent: Nov. 12, 2019

(54) MULTI-DENSITY CORE SURFBOARD BLANK AND METHOD OF MAKING

(71) Applicant: Surftech, Carlsbad, CA (US)

(72) Inventors: Kym Thompson, Chonburi (TH); Trent Michael Pedersen, Chonburi (TH); Daniel Bryan Watts, Carlsbad, CA (US)

( * ) Notice: Subject to any disclaimer, the term of this patent is extended or adjusted under 35 U.S.C. 154(b) by 0 days.

(21) Appl. No.: 16/053,932

(22) Filed: Aug. 3, 2018

(65) Prior Publication Data

US 2019/0039697 A1     Feb. 7, 2019

Related U.S. Application Data

(60) Provisional application No. 62/542,105, filed on Aug. 7, 2017.

(51) Int. Cl.
| | |
|---|---|
| *B63B 35/79* | (2006.01) |
| *B32B 7/02* | (2019.01) |
| *B32B 27/06* | (2006.01) |
| *B32B 27/30* | (2006.01) |
| *B32B 27/40* | (2006.01) |

(52) U.S. Cl.
CPC ............ *B63B 35/7909* (2013.01); *B32B 7/02* (2013.01); *B32B 27/065* (2013.01); *B32B 27/302* (2013.01); *B32B 27/40* (2013.01); *B32B 2250/24* (2013.01); *B32B 2266/0228* (2013.01); *B32B 2266/0278* (2013.01)

(58) Field of Classification Search
CPC ............ B63B 35/7906; B63B 35/7909; B32B 27/065
See application file for complete search history.

(56) References Cited

U.S. PATENT DOCUMENTS

| | | |
|---|---|---|
| 4,129,911 A | 12/1978 | McDonald |
| 7,033,236 B1 | 4/2006 | Yomazzo et al. |
| 7,331,835 B2 | 2/2008 | Renard et al. |
| 7,740,512 B1 | 6/2010 | Patterson |
| 9,463,588 B2 | 10/2016 | Longo et al. |
| 9,701,370 B2 | 7/2017 | Walker |
| 9,738,356 B2 | 8/2017 | Peter |
| 9,751,598 B2 | 9/2017 | Huarcaya-Pro |
| 2005/0060895 A1 | 3/2005 | Huarcaya-Pro |
| 2007/0218787 A1 | 9/2007 | Carter et al. |
| 2008/0032575 A1 | 2/2008 | Wyrsta |
| 2008/0083488 A1 | 4/2008 | Warmuth |
| 2009/0011667 A1 | 1/2009 | Hayward et al. |
| 2014/0099500 A1 | 4/2014 | Chotikapanich |
| 2015/0239533 A1* | 8/2015 | Walker ................ B63B 35/7909 441/74 |

(Continued)

*Primary Examiner* — Andrew Polay
(74) *Attorney, Agent, or Firm* — Eric Hanscom

(57) ABSTRACT

This invention is directed toward a surfboard made from at least two different types of foam and laminating methods. The general invention has a central core, preferably of EPS foam, and two outside panels—located either on the sides, or rails, of the blank, or above and below the central core. In a preferred embodiment, the panels are made from PU foam, and the panels are attached to the central core through a laminating substrate, which can be another type of foam or copolymer, such as TPU, or a harder material such as plastic or wood. The invention produces a blank that can be shaped into a surfboard that is both strong and flexible.

10 Claims, 13 Drawing Sheets

(56) References Cited

U.S. PATENT DOCUMENTS

2016/0101835 A1\* 4/2016 Barron ................ B63B 35/7906
                                                               441/74
2018/0327061 A1\* 11/2018 de Jager ............. B63B 35/7909

\* cited by examiner

MULTI-DENSITY CORE SURFBOARD BLANK AND METHOD OF MAKING

CROSS REFERENCE TO RELATED APPLICATIONS

This application claims priority back to U.S. Provisional Application No. 62/542,105, entitled Multi-density Core Surfboard Blank and Method of Making, filed 7 Aug. 2017, the contents of which are incorporated by reference.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of surfboards and surfboard manufacturing, and more specifically to a surfboard blank made from more than one type of foam and material.

Brief Description of Invention

The invention herein described is a surfboard blank with two outside panels that are made from a "blank foam" that is of a different density than the main body of the board is made from. The central core of the board is made from traditional expanded PolyStyrene (EPS), which the outside panels are made from Polyurethane (PU) foam. The two types of foam are connected or laminated together with resin and a Substrate, which can be another type or density of foam, or a harder material such as a copolymer, composite or wood material. In a preferred embodiment for high-performance surfboards, the laminating substrate is Thermoplastic polyurethane (TPU), which has a beneficial combination of high shear strength and high elasticity. In another preferred embodiment, this one for thicker, "groveler" boards, EVA is the preferred substrate.

The EPS core gives the surfer more paddling speed (making it easier to paddle back "outside" after catching a wave, and making it easier to paddle into a wave to catch it), and gives the board faster surfing speed while riding a wave. The PU outside panels give the resulting surfboard a more flexible "rail" or side, which allows the rider to get more force out of a turn and to be more forgiving both on choppy wave faces and when recovering from a difficult maneuver, as the PU is a more absorbing foam than is EPS. The laminating layer serves as a "shock absorber" between the PU and EPS sections of the surfboard and creates rebound when the surfboard is flexing, and decreases the amount of "chatter" that a surfer experiences when riding across choppy wave surfaces.

Background of surfboard blanks. A surfboard is made by taking a "blank", which is a molded plank of EPS or PU (in some rare cases, a lightweight wood such as balsa wood), and shaping it to a final shape. First, the outline of the eventual surfboard is created through making a vertical cut through the blank. Then, the rough upper and lower surfaces of the blank are removed with a power planer, Computer Numerical Control (CNC) machine, or suitable tool. The shaper (or CNC machine) than begins to make a series of cuts into the top, bottom and sides of the board to give it the final top surface, bottom surface (complete in some cases with channels, grooves, and other planned irregularities), and the rails, or sides of the surfboard.

After the shaping is complete, the shaper often uses a fine mesh screen and sandpaper to smooth out the surfaces of the board. After this, one or more layers of fiberglass are laid on the board an impregnated with laminating resin (one side at a time and often Epoxy resin). The excess fiberglass is then trimmed away and a coat of surfacing resin in then applied to the board, and sanded down. An optional gloss coat is then added and buffed out before the board is sold to the end user.

Until this invention, surfboard purchasers' main choice was what density of blank they would prefer, with, obviously, more dense blanks resulting in strong, but heavier, surfboards. Thus, a surfer could only get the flexibility that comes from a lighter blank by having the entire surfboard made from that lighter (and weaker) foam. Thus, it is desirable that a surfer be able to surf upon a surfboard that is both strong and flexible.

This invention provides a solution to this problem by providing a surfboard blank made from two or more different densities of foam.

In a first embodiment, the central core of the board is made from EPS foam, which each panel along the rails of the surfboard are made from PU foam. The layers are attached to one another through a laminating resin and a substrate, which can be another type of foam or a harder material such as a copolymer, composite or wood materials. The invention produces a surfboard that is both strong and flexible. A preferred substrate is EVA foam. EVA foam is a suitable substitute for natural rubber, vinyl, neoprene, polyurethane and PVC foams, wood composites, felts, fiberglass, and mineral wool. The EVA foam material characteristically provides good strength at low-temperatures, retains its resistance to UV radiation and stress-cracking, excellent elasticity, and possesses hot-melt adhesive waterproof properties.

EVA foam provides a number of benefits vibration and impact absorptions, weather and chemical, oil, and fuel spill/splash resistances. It is also useful for thermal insulation and acoustical properties, and resilience/buoyancy and low-water absorption.

In a second embodiment, rather than being sectioned vertically, the blank can be sectioned horizontally, such that the central core is "sandwiched" by two sheets of foam of different densities. It is contemplated that this embodiment can be manufactured both with a thin layer of adhering substrate or without. For the versions with a substrate (reference number 2 in the figures), it is contemplated that the substrate could be located on either, or both sides of the central core, or on either or both sides of the outside layers of foam

OBJECTS OF THE INVENTION

It is therefore an object of the present invention to provide a surfboard with a strong central core and flexible rails.

It is an additional object of the invention to provide a surfboard blank with a horizontal sheet of a first type of foam, sandwiched in between two other sheets of a second type of foam.

Additional objects of the invention include providing a number of aesthetic combinations utilizing different colors of foam and laminating substrates such that a strong but flexible surfboard can be constructed that is both durable, functional, and attractive to the eye.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE FIGURES

One preferred form of the invention will now be described with reference to the accompanying drawings.

DETAILED DESCRIPTION OF THE FIGURES

Figure 1:
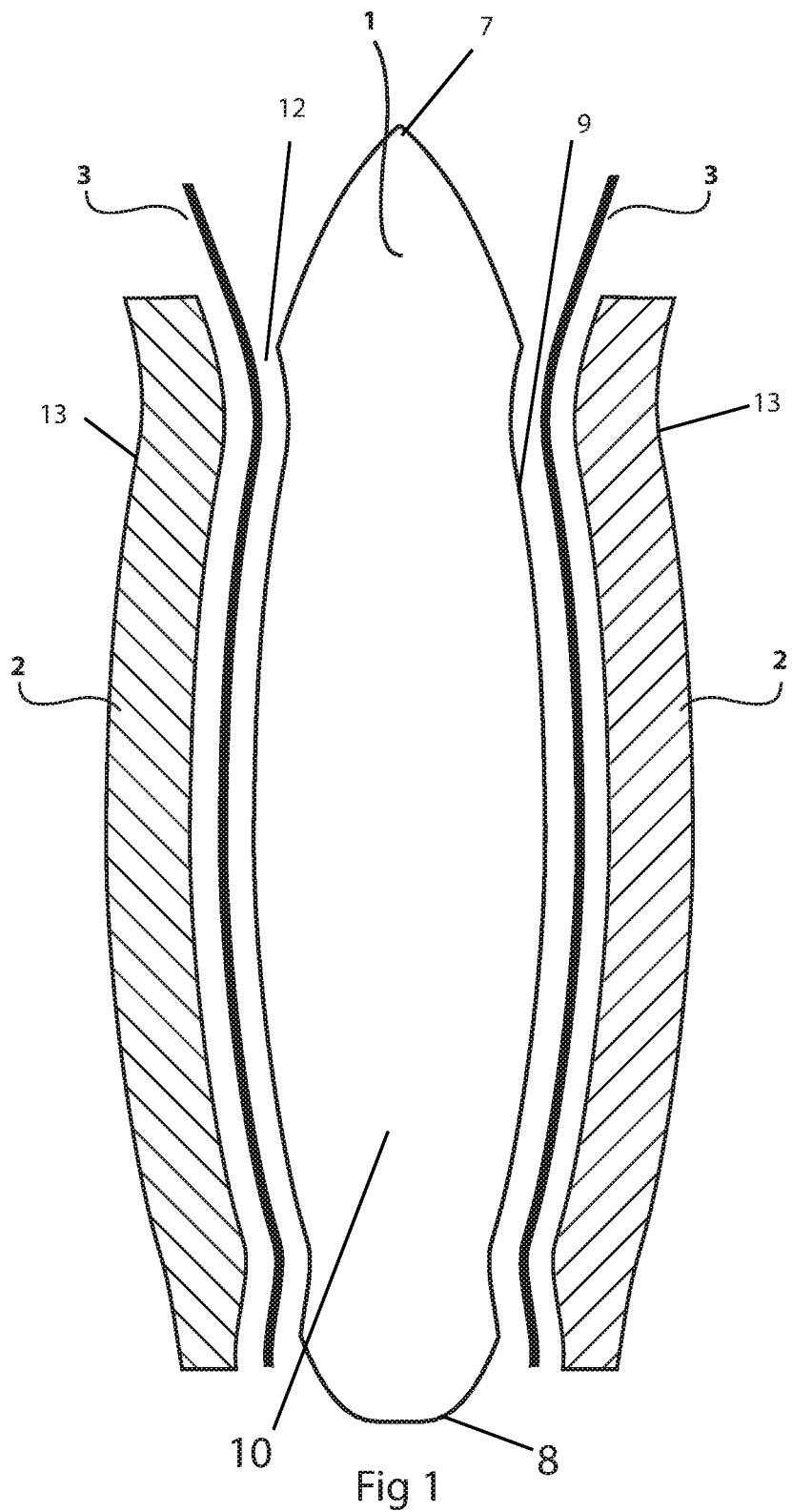
FIG. 1 is top view of the invention with the main parts separated out.

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

REFERENCE NUMBERS USED

1. Core
2. Outside panels
3. Substrate
4. Rocker
5. Deck
6. Bottom
7. Core Front
8. Core Back
9. Core Side
10. Core Top
11. Core Bottom
12. Cut Out
13. Outside Panel
14. Deck Panel
15. Bottom Panel FIG. 1 is top view of one embodiment of the invention with the main parts separated out. A central core 1 of, preferably, Expanded Polystyrene Foam (EPS) has been pre-cut with sections of the rail (side of the eventual surfboard) removed. Two outside panels 2, preferably of Polyurethane Foam (PU), have also be pre-cut, or, optionally, pre-molded, such that they nestle into the curvature of the sections cut out—called "cut outs"—of the central EPS core 1. Connecting the outside panels 2 to the central core 1 are two Laminating Substrates 3. These laminating substrates can be plastic, wood, or even a third section of foam, but the main purpose is to attach the outside panels 2 to the central core 1 and provide some shock absorption between the outside panel 2 and the central core 1. It should be noted that the density and flexibility of the foam making up the central core 1 is different than the foam making up the outside panels 2. The EPS making up the central core 1 is denser, stronger, but less flexible than the PU making up the outside panels 2, creating a surfboard that paddles and rides wave at a high speed (due to the EPS central core 1), handles chop in the wave faces well due to the flexible PU outside panels 2, with the laminating substrate 3 cushioning the shock absorbed by the outside panels 2 such that less shock radiates into the central core 1 to slow down the surfboard. The central core 1 has a core front 7, a core back 8, two core sides 9, which are formed by cutting out some sides of the original core, forming two cut outs 12, which mate with two outside panels 13. The central core 1 has a core top 10, which is the upper deck of the eventual surfboard, and a core bottom (reference number 11 in FIG. 5).

Figure 2:
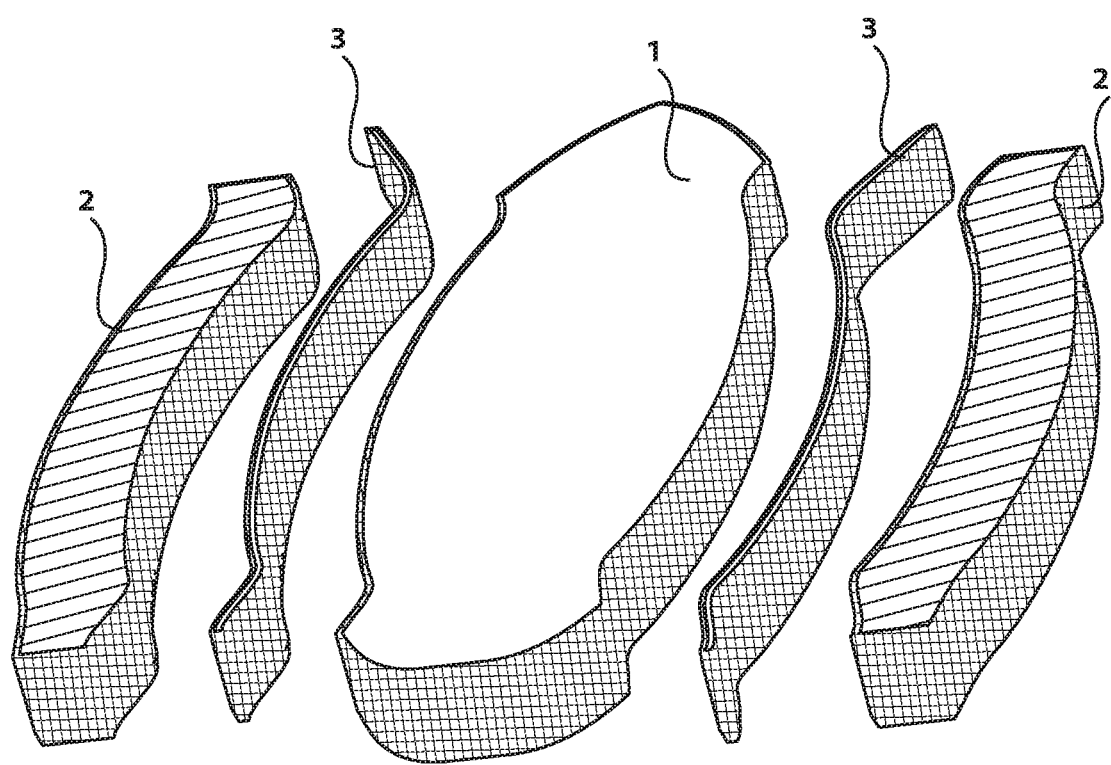
FIG. 2 is a top, perspective view of the various parts in a three-dimensional view.

FIG. 2 is a top, perspective view of the various parts in a three-dimensional view. Like pieces of a jigsaw puzzle, the central core 1 sandwiched between two outside panels 2, with the laminating substrates 3 providing the means of attachment. The blank is then put into a press and allowed to dry.

Figure 3:
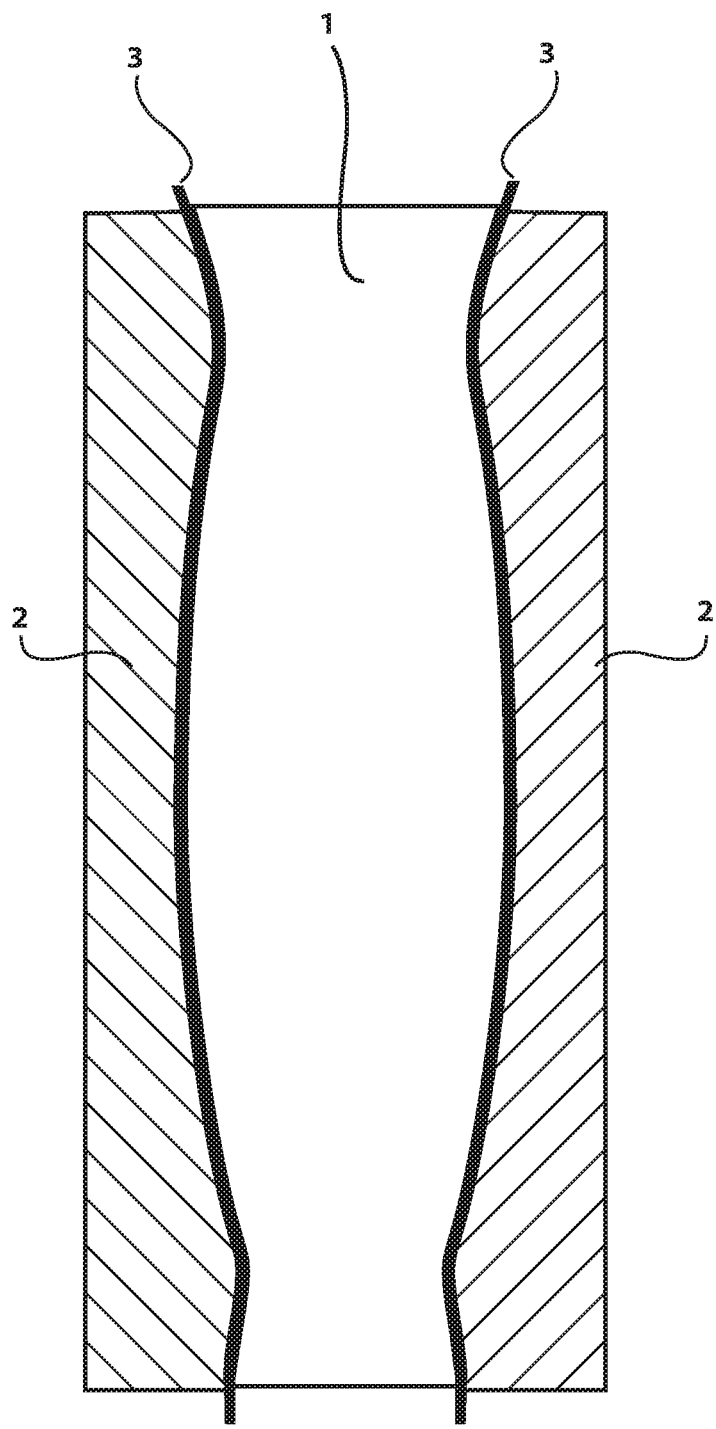
FIG. 3 is a top of the blank once it has been put together but before it has been cut and shaped into the final version.

FIG. 3 is a top view of the blank once it has been put together but before it has been cut and shaped into the final version. In this figure, the three parts as illustrated in FIGS.

1 and 2 have been permanently attached to each, with the laminating substrates 3 making a permanent bond between the central core 1 and the two outside panels 2. The glue in between the central core 1 and laminating substrates 3, and in between the laminating substrates 3 and outside panels 2 has been allowed to dry, and because it was allowed to dry while the entire composition in pressed together with vices, the resulting blank is one contiguous composite of three different materials.

Figure 4:
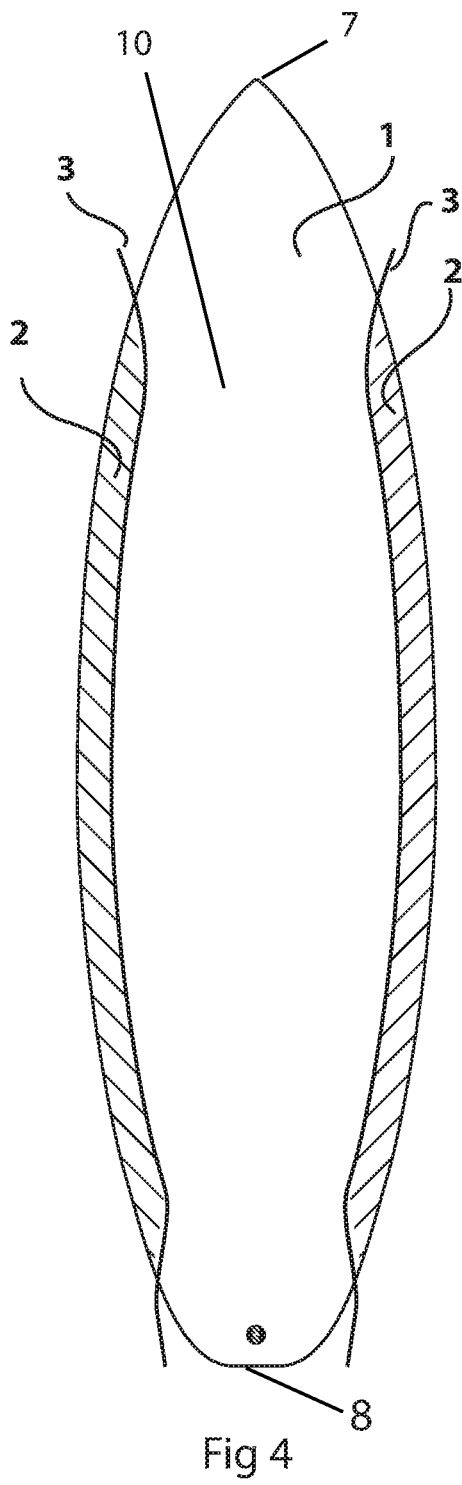
FIG. 4 is a top view of the final version of a surfboard that has been made with a different foam on the rails than was used in the center core of the surfboard.
Figure 5:
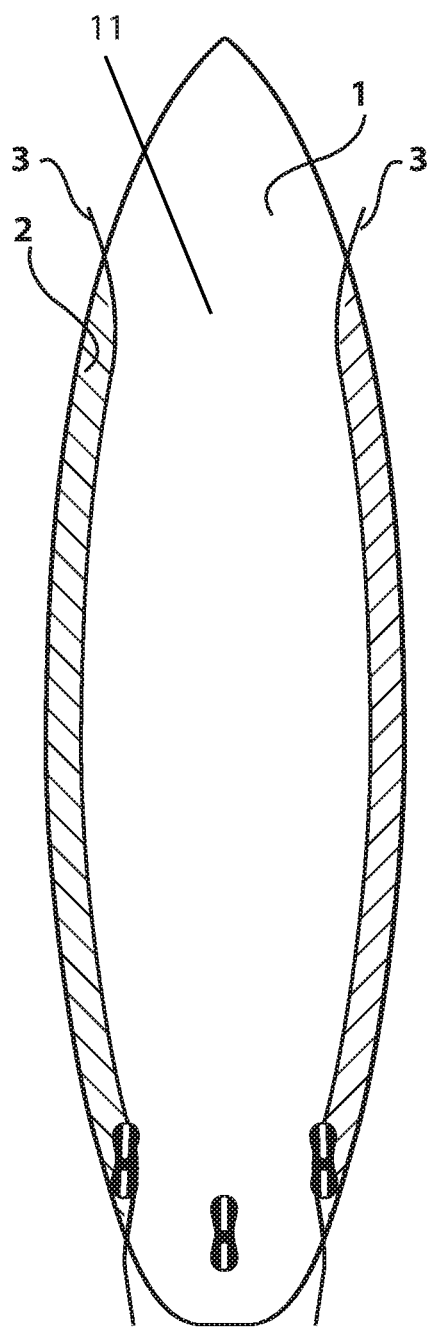
FIG. 5 is a bottom view of the surfboard illustrated in FIG. 4.

FIGS. 4 and 5 are, respectively, a top view and a bottom view of the final version of a surfboard that has been made according to the procedure taught in this patent application. The shape of the surfboard has been cut out from the square "blank" that is illustrated in FIG. 3, and the sides shaped down into a modern surfboard. The outside panels 2 remain on the rails, or sides of the surfboard, and remain attached to the central core 1 by the laminating substrates 3.

Figure 6:
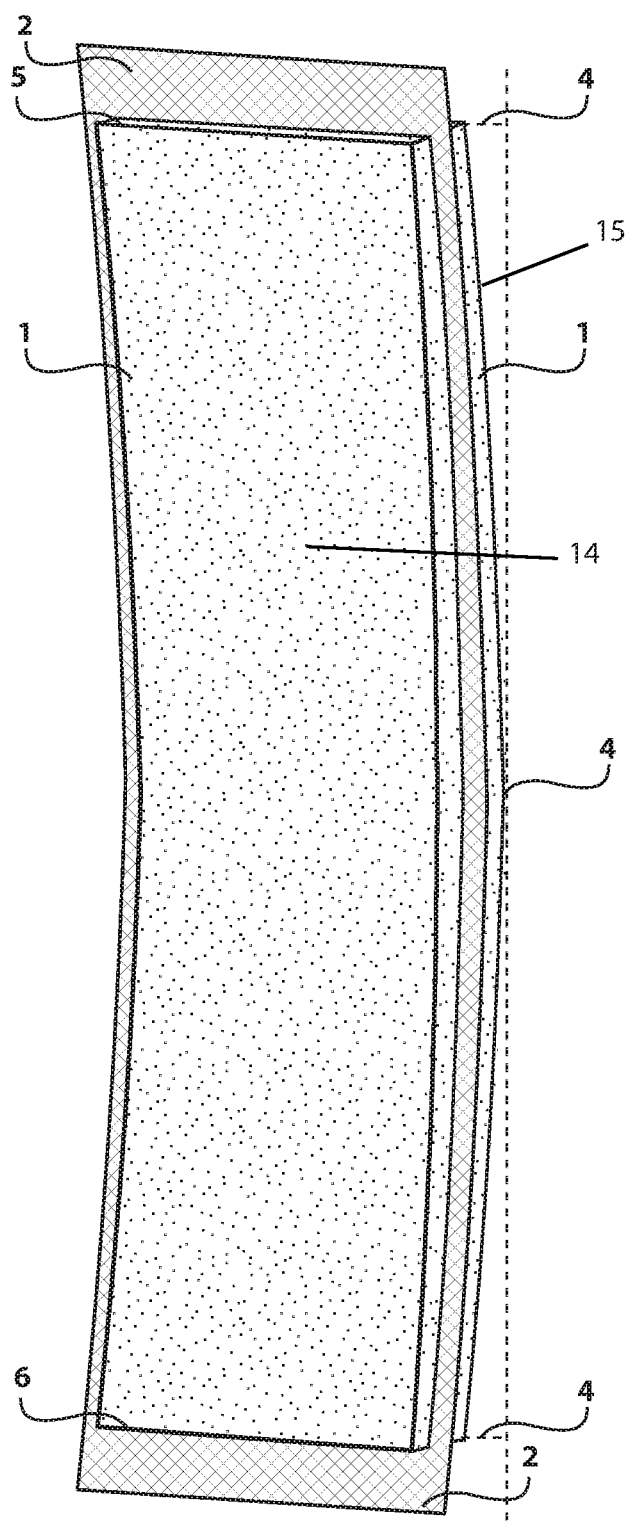
FIG. 6 is a perspective view of another embodiment of the invention where the different layers of foam and substrate are layered in a horizontal manner.

FIG. 6 is a perspective view of another embodiment of the invention where the different layers of foam and substrate are layered in a horizontal manner. In this embodiment, there is a central core 1 that in sandwiched between two outside panels 2. The upper layer is called a deck panel 14 and the bottom layer is called a bottom panel 15. The combination of these two types of foam creates a surfboard which is strong, lightweight, gives improved push off of bottom turns and dampens the "chatter" when the surfer is riding across choppy water.

Figure 7:
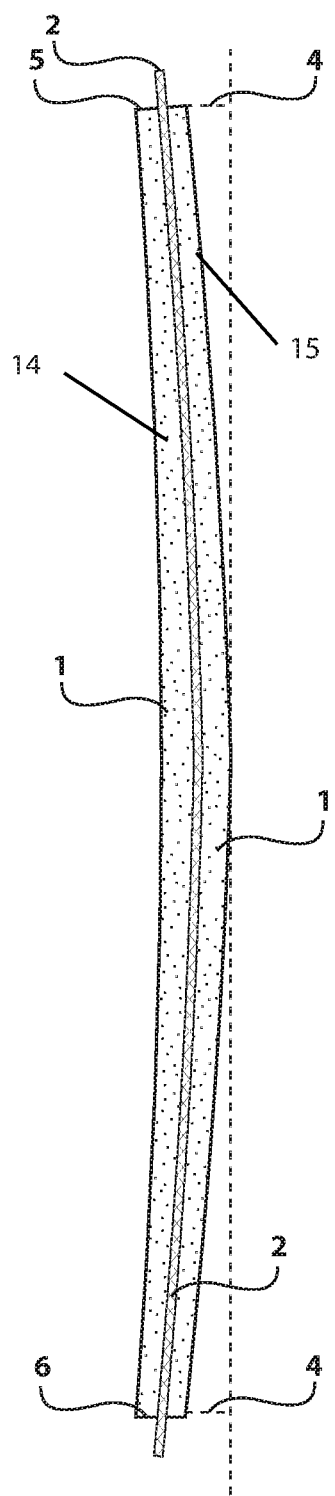
FIG. 7 is a side view of another embodiment of the invention where the different layers of foam and substrate are layered in a horizontal manner.

FIG. 7 is a side view of the embodiment of the invention where the different layers of foam and substrate are layered in a horizontal manner as illustrated in FIG. 6. The blank is bent slightly up to create a rocker 4, which is the amount the front of the surfboard is lifted above the main body of the surfboard to prevent the nose of the surfboard from catching, or pearling. Thus, there is an outside layer 2 of foam on both the deck 5 and the bottom 6 of the surfboard, forming the deck panel 14 and bottom panel 15, respectively.

Figure 8:
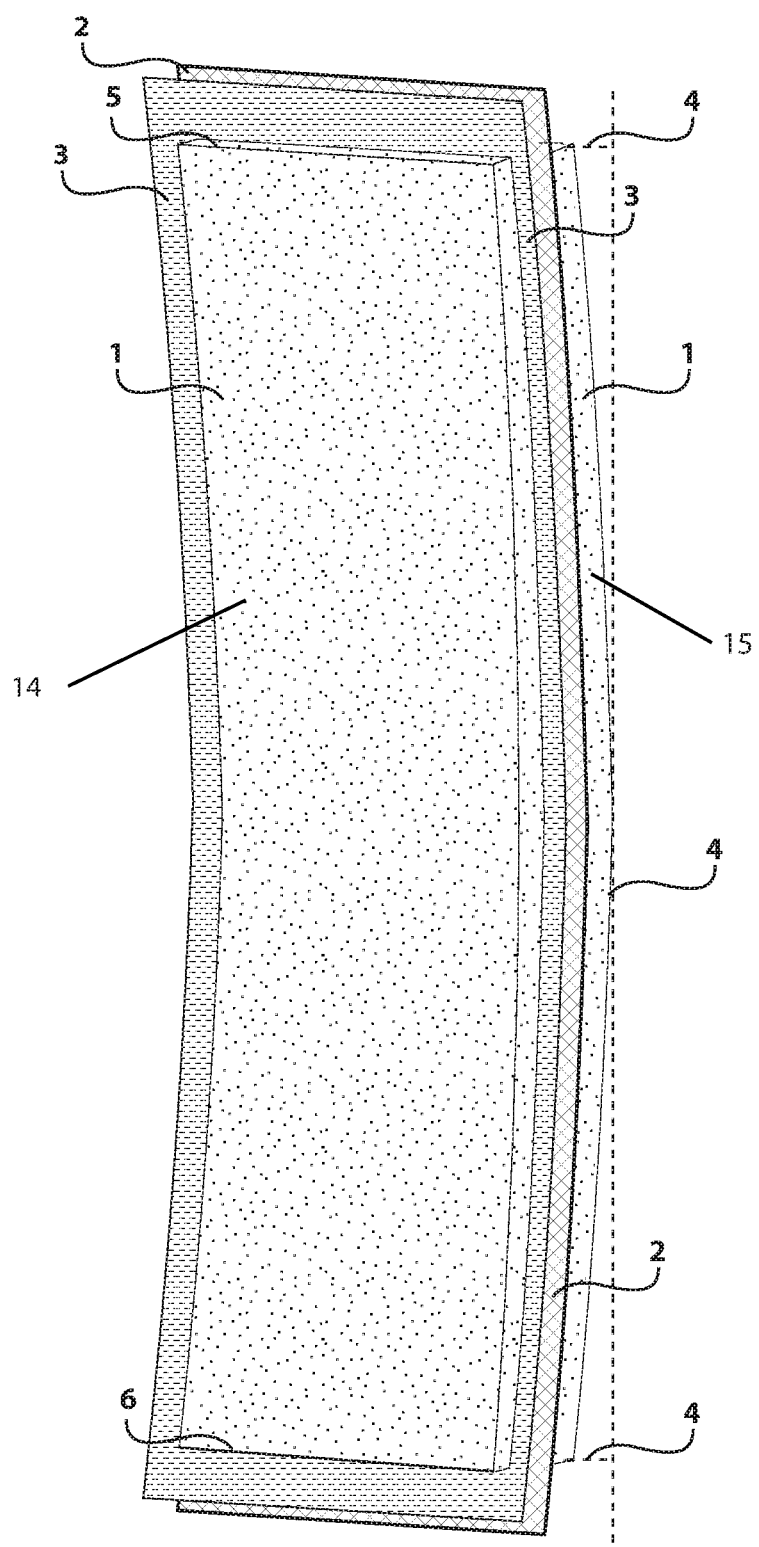
FIG. 8 is a perspective view of another embodiment of the invention where the different layers of foam and substrate are layered in a horizontal manner.

FIG. 8 is a perspective view of another embodiment of the invention where the different layers of foam and substrate are layered in a horizontal manner. In this embodiment, the central core 1 is sandwiched by two outside panels 2, as in the embodiment illustrated by FIGS. 6 and 7, but in this embodiment, a thin layer of substrate 2 is positioned between the center core 1 and the outside panel 2 on the deck side of the blank.

Figure 9:
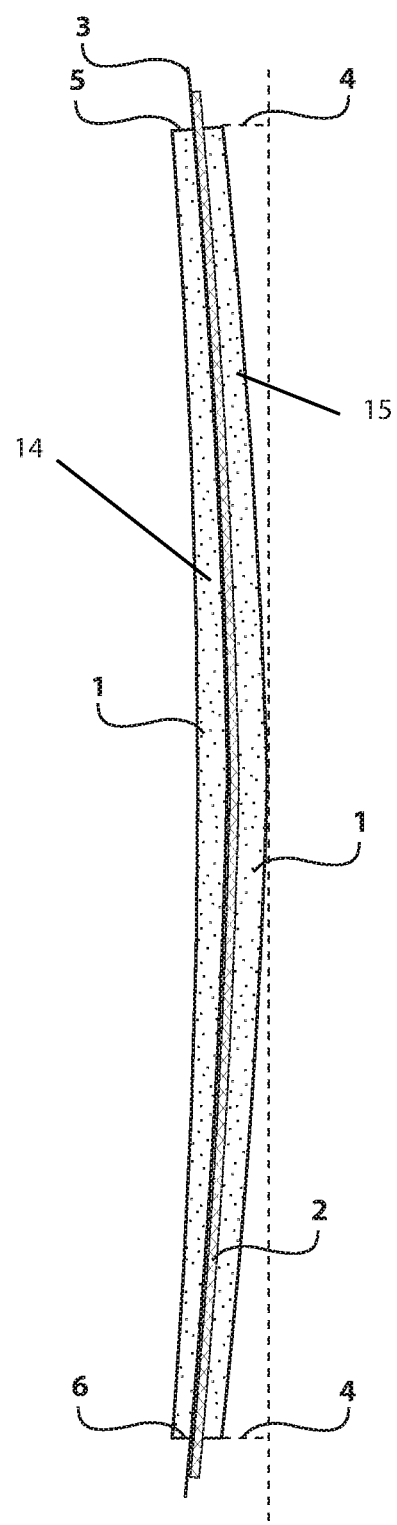
FIG. 9 is a side view of another embodiment of the invention where the different layers of foam and substrate are layered in a horizontal manner.

FIG. 9 is a side view of another embodiment of the invention illustrated by FIG. 8.

Figure 10:
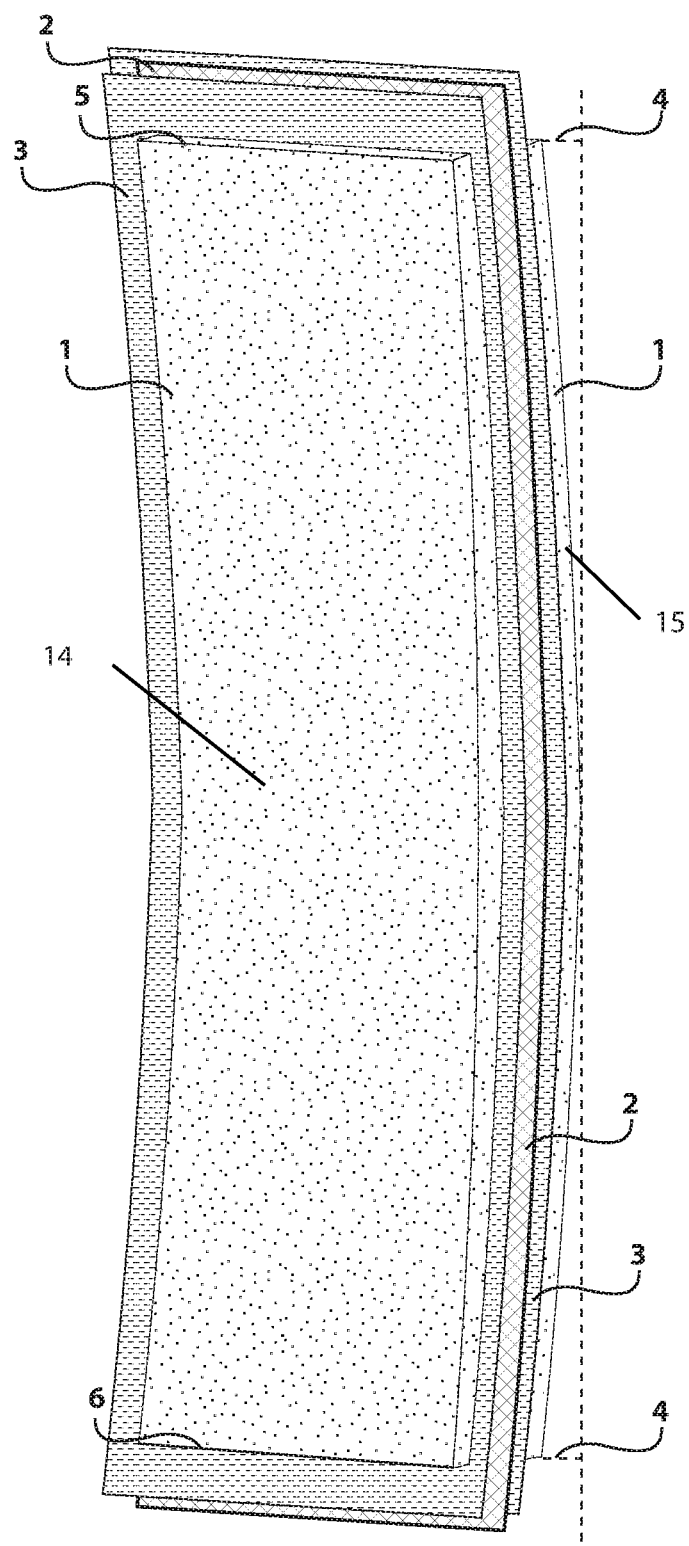
FIG. 10 is a perspective view of another embodiment of the invention where the different layers of foam and substrate are layered in a horizontal manner.

FIG. 10 is a perspective view of another embodiment of the invention where the different layers of foam and substrate are layered in a horizontal manner. In this embodiment, the central core 1 is sandwiched by two outside panels 2—a deck panel 14 and a bottom panel 15 —, as in the embodiment illustrated by FIGS. 6 and 7, but in this embodiment, a thin layer of substrate 2 is positioned between the center core 1 and the outside panel 2 on the deck side of the blank and a second thin layer of substrate 2 is positioned between the center core 1 and the outside panel 2 on the bottom side of the blank.

Figure 11:
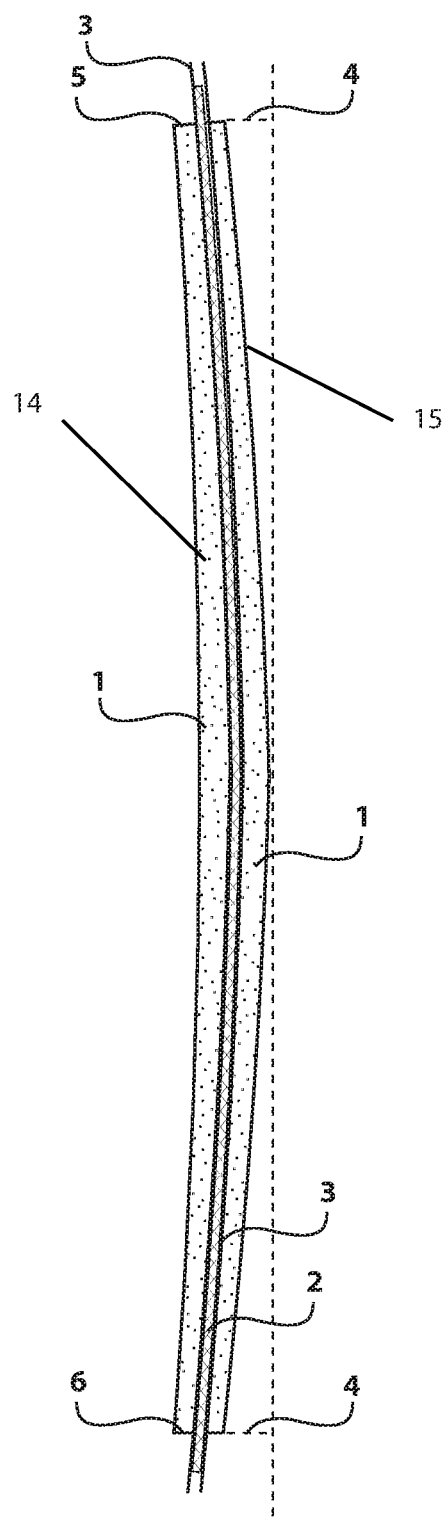
FIG. 11 is a side view of another embodiment of the invention where the different layers of foam and substrate are layered in a horizontal manner.

FIG. 11 is a side view of another embodiment of the invention illustrated in FIG. 10.

Figure 12:
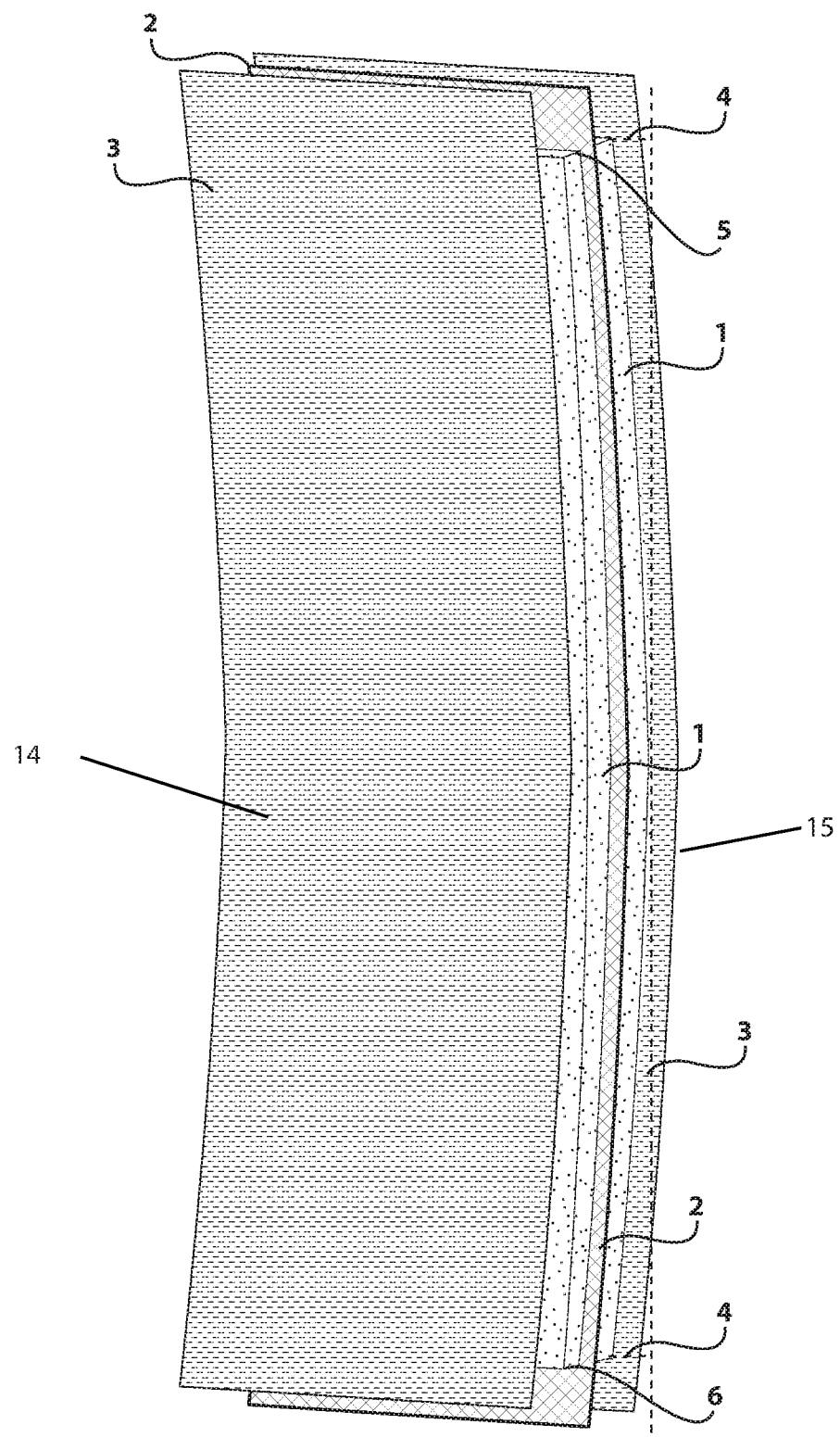
FIG. 12 is a perspective view of another embodiment of the invention where the different layers of foam and substrate are layered in a horizontal manner.

FIG. 12 is a perspective view of another embodiment of the invention. In this embodiment, the center core 1 is sandwiched between outside panels 3—a deck panel 14 and a bottom panel 15 —, which in turn are sandwiched between two thin layers of substrate 2.

Figure 13:
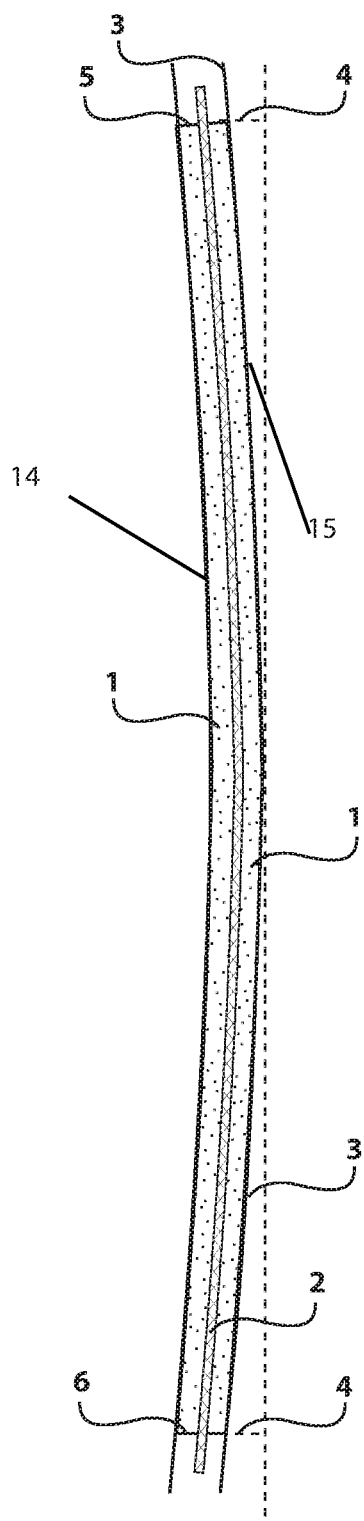
FIG. 13 is a side view of another embodiment of the invention where the different layers of foam and substrate are layered in a horizontal manner.

FIG. 13 is a side view of another embodiment of the invention as illustrated in FIG. 12.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

That which is claimed:

1. A multi-density surfboard blank, comprising a central core, two outside panels, where the central core is made from a foam of a first density, and the two outside panels are made from a foam of a second density, and the first density is different from the second density, where the central core comprises a core front, a core back, two core sides, a core top and a core bottom, where the two outside panels are connected to the two core sides, with one outside panel connected to each of the two core sides, where each of the two core sides additionally comprises a cut-out, where each of the outside panels comprises an inner side and an outer side, where the inner side is connected to the cut-out of the core, where the inner side of each outside panel is configured to mate with the cut-out of the core, additionally comprising two substrates, where one substrate is located on each of the two sides of the central core, and where the two substrates connect the two outside panels to the two cut-outs of the central core, where the central core is manufactured from EPS foam and the two outside panels are manufactured from PU foam.

2. The multi-density core surfboard blank of claim 1, where the laminating substrate is manufactured from TPU.

3. The multi-density core surfboard blank of claim 2, where the central core is manufactured from EPS foam, the two outside panels are manufactured from PU foam, the laminating substrate is manufactured from TPU, and where the one of more types of glue is used to connect each of the two outside panels to the two laminating substrates, and to connect each of the two laminating substrates to the central core.

4. The multi-density core surfboard blank of claim 1, where the central core comprises a core front, a core back, two core sides, a core top and a core bottom, where one of the two outside panels is a deck panel, and the deck panel is connected to the core top, where one of the two outside panels is a bottom panel and is connected to each of the core bottom, where the central core is manufactured from EPS foam, where the two outside panels are manufactured from PU foam, additionally comprising one at least one substrate, where the at least one substrate is manufactured from TPU, and where the at least one substrate is located between central core and one of the two outside panels, and where the at least one substrate attaches the central core to one of the two outside panels.

5. The multi-density core surfboard blank of claim 4, additionally comprising one substrate, where the one substrate is located above the central core and below the deck panel, and where the one substrate attaches the central core to the deck panel.

6. The multi-density core surfboard blank of claim 5, where the laminating substrate is manufactured from TPU.

7. The multi-density core surfboard blank of claim 4, additionally comprising one substrate, where the one substrate is located below the central core and above the bottom panel, and where the one substrate attaches the central core to the bottom panel, and, where the laminating substrate is manufactured from TPU.

8. The multi-density core surfboard blank of claim 4, additionally comprising two substrates, where one of the two substrates in an upper substrate, and where the upper substrate is located above the central core and below the deck panel, and where the upper substrate attaches the central core to the deck panel, and where one of the two substrates is a lower substrate, and where the lower substrate is located below the central core and above the bottom panel, and where the lower substrate attaches the central core to the bottom panel.

9. The multi-density core surfboard blank of claim 8, where one substrate is a deck substrate, and where the deck substrate is located on an upper surface of the deck panel, and where one substrate is a bottom substrate, and where the bottom substrate is located on a lower surface of the bottom panel, and where the laminating substrate is manufactured from TPU.

10. The multi-density core surfboard blank of claim 4, where the foam of a first density has a first color, and the foam of a second density has a second color, and where the first color is different from the second color.

* * * * *